(12) United States Patent
Errington et al.

(10) Patent No.: US 7,393,492 B2
(45) Date of Patent: Jul. 1, 2008

(54) BIO-DEGRADABLE FOAMED PRODUCTS

(75) Inventors: John Gough Errington, Christchurch (NZ); Anya Jane Hornsey, Fairlie (NZ); Timothy James Chapman, Christchurch (NZ); Philip James Quinn, Christchurch (NZ); Maria Louise Wake, Christchurch (NZ)

(73) Assignee: Novamont S.p.A., Novara (IT)

( * ) Notice: Subject to any disclaimer, the term of this patent is extended or adjusted under 35 U.S.C. 154(b) by 192 days.

(21) Appl. No.: 10/493,947

(22) PCT Filed: Oct. 29, 2002

(86) PCT No.: PCT/NZ02/00226

§ 371 (c)(1),
(2), (4) Date: Aug. 26, 2004

(87) PCT Pub. No.: WO03/037598

PCT Pub. Date: May 8, 2003

(65) Prior Publication Data
US 2005/0158533 A1    Jul. 21, 2005

(30) Foreign Application Priority Data
Oct. 29, 2001   (NZ) .................................. 515097

(51) Int. Cl.
*B29C 44/02*     (2006.01)

(52) U.S. Cl. ...................... 264/417; 264/402
(58) Field of Classification Search ............. 264/415, 264/413, 417, 464, 474, 41, 51
See application file for complete search history.

(56) References Cited

U.S. PATENT DOCUMENTS

| | | | | | |
|---|---|---|---|---|---|
| 4,298,324 | A | * | 11/1981 | Soulier | 425/174.8 E |
| 4,655,276 | A | * | 4/1987  | Bird et al. | 164/519 |
| 4,721,835 | A | * | 1/1988  | Welker | 219/689 |
| 5,043,196 | A | * | 8/1991  | Lacourse et al. | 428/35.6 |
| 5,378,792 | A | * | 1/1995  | Sterzel | 521/138 |
| 5,589,518 | A | * | 12/1996 | Bastioli et al. | 521/55 |
| 5,707,579 | A | * | 1/1998  | Habelski et al. | 264/417 |
| 5,725,733 | A | * | 3/1998  | Brandauer et al. | 162/101 |
| 5,844,217 | A | * | 12/1998 | Hawley et al. | 219/762 |
| 6,013,125 | A | * | 1/2000  | Quraishi et al. | 106/38.35 |

(Continued)

FOREIGN PATENT DOCUMENTS

EP              692357              1/1996

(Continued)

OTHER PUBLICATIONS

Derwent Abstract Accession No. 2001-041739/06.

*Primary Examiner*—Mary Lynn F Theisen
(74) *Attorney, Agent, or Firm*—Connolly Bove Lodge & Hutz LLP (57) ABSTRACT

The method provided produces a bio-degradable foamed material with qualities of uniformity of mechanical and physical properties throughout the product including a foam thickness of up to one meter and a finished foam surface suitable for packaging applications. The parameters for producing such a product are selected from a range of variables which includes wall thickness, mold material, use of a susceptor and the type and composition of a susceptor, the number and arrangement of magnetrons and mold shape. Complex shapes produced by the process are also disclosed.

37 Claims, 4 Drawing Sheets

U.S. PATENT DOCUMENTS

| | | | |
|---|---|---|---|
| 6,156,359 A * | 12/2000 | Segal | 426/241 |
| 6,165,300 A * | 12/2000 | Elsner et al. | 156/78 |
| 6,464,672 B1 * | 10/2002 | Buckley | 604/304 |
| 6,494,704 B1 * | 12/2002 | Andersen et al. | 425/258 |
| 6,768,089 B2 * | 7/2004 | Minobe et al. | 219/699 |
| 6,984,352 B1 * | 1/2006 | Akopyan | 264/219 |
| 2001/0014388 A1 * | 8/2001 | Bastioli et al. | 428/315.7 |
| 2004/0092613 A1 * | 5/2004 | Errington et al. | 521/79 |
| 2004/0137202 A1 * | 7/2004 | Hamilton et al. | 428/174 |
| 2004/0219271 A1 * | 11/2004 | Belknap et al. | 426/549 |
| 2005/0035499 A1 * | 2/2005 | Beckmann | 264/415 |
| 2006/0013929 A1 * | 1/2006 | Morris et al. | 426/383 |

FOREIGN PATENT DOCUMENTS

| | | |
|---|---|---|
| GB | 2326124 | 12/1998 |
| WO | WO 90/08642 | 8/1990 |
| WO | 707034 | 4/1996 |
| WO | WO 98/51466 | 11/1998 |
| WO | WO 02/14043 | 2/2002 |

* cited by examiner

BIO-DEGRADABLE FOAMED PRODUCTS

This application is a continuation of application PCT/NZ02/00226, the entire contents of which is incorporated herein by reference.

TECHNICAL FIELD

The present invention relates to improvements in the manufacture of biodegradable foamed materials. More specifically the patent relates to an improved process of using microwaves to produce biodegradable foamed shapes. The present invention further relates to the equipment and method used in producing foamed products.

BACKGROUND ART

The present invention builds on the invention disclosed in PCT/NZ01/00052. In this patent application, a two stage process is described for producing a biodegradable foamed product with improved packaging properties including resilience, compressibility and shock absorption. The entirety of PCT/NZ01/00052 is incorporated herein by reference.

It is an object of the present invention to produce a novel bio-degradable foamed product.

The field of starch based bio-degradable foamed materials is widely discussed in the prior art. A variety of products exist that attempt to produce bio-degradable foamed materials as discussed in PCT/NZ01/00052.

Extruded Starch Foams for Molded Shapes

Patent U.S. Pat. No. 5,730,824 (National Starch) utilizes extrusion to produce foam panels. These panels are then laminated together to form thick sheets, which can be wire cut to varying size and shapes. This process has limitations due to the expensive capital equipment required for manufacturing. As a result of the expensive equipment, the method necessitates shipping 'air' as the product can only be made in central locations. In addition the shapes are either very limited or costly because they have to be cut out of sheets instead of molded during the foaming process.

Another example, U.S. Pat. No. 5,801,207 (Novamont) relates to taking foamed starch pieces, placing them in a bag or within layers of sheeting and molding the pre-expanded peanuts in foam-in-place molds. The limitations of this method are that the foamed peanuts used to make the molds are very bulky and take up a lot of store space, and again increase expense through having to ship 'air' to the point of use instead of sending dense pellets that can be foamed at point of use. The method is also a complicated procedure for the end-user, as they have to fill and seal bags of foamed peanuts and then molds the bag to the product shape.

From the above it is hence useful to have a process that allows in situ foaming and further, that the equipment is relatively inexpensive and simple to use.

Microwaved Starch Foams for Molded Shapes

Two main patents, WO9851466 (Ato-Dlo) and U.S. Pat. No. 5,639,518 (NKK), utilize dielectric heating in processing the starch based materials.

In WO9851466 (Ato-Dlo), the dielectric heating does not take into account the changing dielectric properties of the material as it heats, nor the relationship between the rheological properties (for example elasticity and viscosity) and the rate of heating. It further doesn't identify or address the detrimental effect of vapor condensation on the foam surface finish when such a process is used.

Patent U.S. Pat. No. 5,639,518 (NKK), utilizes a number of different electromagnetic and electroconductive methods for producing foam bio-degradable shapes. It does not identify the importance of a rate of heating profile or specific rheology of the material being heated on the success of foaming thick walled bio-degradable shapes. It further does not identify or address the detrimental effect of vapor condensation on the foam surface finish when utilizing microwave frequency irradiation.

A further patent, WO 02/20238, (Ato B.V.), details a process of steam heating taking 5 minutes to heat, under pressure, to the desired temperature range of 185° C. Such a long processing time reduces throughput significantly for a semi-continuous process.

In addition, the methods described above produce foams with varying consistency depending on the shape required and, often without the combination of uniform physical and mechanical properties. These properties include density, compressibility, resilience and shock absorption. All of these properties limit the product applications. It is therefore desirable to have a method of processing that can produce a uniform product using equipment that is relatively inexpensive and simple to use.

Microwave Oven Designs

U.S. Pat. No. 4,908,486 (Nearctic Research Centre) describes a multiple magnetron microwave oven design where the oven is comprised of a cavity and at least one energy source. The main advantage disclosed of multiple energy sources is that the uniformity of drying is improved thus avoiding hot spots and cold spots inherent in some designs using only single energy sources. The oven is described as being useful for the drying of granular food crops including grain, rice, some fruits and beans. The apparatus does not however give consideration to use for foaming of materials, an object of the present invention. Further it does not consider the influence of adjusting the power density of the energy sources. The specification does not teach of processing multiple work pieces at any one time and further, does not address the use of molds, shapes and objects other than granular materials.

It is hence useful to have an apparatus that addresses aspects such as variable energy density, and complex multiple work pieces.

Surface Coatings

In attempts to improve the surface texture or colour of microwaved products, susceptors have been considered in a number of applications, especially in domestic food applications. Susceptors are typically metallic films attached to microwave packages which are used in food applications to crisp or brown the food surface.

For foamed bio-degradable materials, where the goal is to produce a soft, smooth finish rather than the crisp texture desired in food applications, problems have been experienced surrounding vapor condensation at the interface between the mold wall and the foamed material. Although this problem is identified for example in U.S. Pat. No. 5,965,080, (NKK), this US patent refers to the problem of vapor breaking down an insulating layer on conductive molds causing arcing, a processing problem specific to the use of conductive molds, rather than the effect of vapor condensation on the surface finish of the foam.

A further patent, U.S. Pat. No. 6,241,929 (Akopyan), recognises that uniformity is affected when the heat flow on the interface between the mold and the foamable material is large and teaches that it is necessary for the material and the mold to have much the same dielectric properties. The patent, whilst describing a principle behind vapor condensation and its effect on uniformity, does not teach of specific processes and examples, particularly for biodegradable foam applications.

It is therefore desirable to have a process utilizing susceptors that also produces a uniform product with a smooth surface finish.

Microwave Mold Designs

U.S. Pat. No. 5,965,080 (NKK) teaches of a method of foaming starch using conductive mold halves and an insulating section between. Both halves then have an alternating current applied thus heating and expanding the material. The importance of having vapor release sections is recognised as otherwise it is acknowledged that insulation breakdown occurs.

This method however has the problem that conductive molds have a limited rate of heating range as arcing occurs with increased power densities. Uniformity is a further problem with this method in that fringe effects occur in corner areas. Further, complex shapes, which include a mix of thin and thick walled foam, are difficult to make using this method as the method is limited by arcing that occurs in thin walled areas.

Two alternative mold arrangements have been considered for expanded plastic materials.

U.S. Pat. No. 4,298,324 (Isobox-Barbier) describes a device for molding expanded plastic material. The device consists of a press, a mold body and resonant cavity combination. Mold surfaces in contact with material being molded are formed from a resin containing carbon black, which has high dielectric losses, and the remaining portion of the mold body is made of a microwave transparent or transmissive material.

U.S. Pat. No. 5,397,225 (Huels) recognises the attributes of good dimensional accuracy and long serviceable lifetime for molds to form latex foams with microwaves. Limitations of practicable wall thicknesses of typical microwave transparent materials are discussed as are exposures to fluctuating temperatures. A new material based on polyphenylene ether with a passivated surface is described.

Whilst both methods describe useful alternatives, the limitations and constraints found from using bio-degradable materials are not considered.

Mold Liners

U.S. Pat. No. 5,508,498 (Invenetics) teaches of a utensil being a matrix material and a microwave absorptive material. The matrix is formed from silicone rubber with a ferrite based absorber material. The patent teaches only of use directed towards food applications and does not consider closed molds or pressure changes that occur within the mold.

U.S. Pat. No. 4,566,804 (CEM) discusses use of a supporting body for analysing a product where the supporting body is comprised of a matrix material and a microwave absorptive material, evenly dispersed within the matrix material, and is characterized by a Curie temperature of 120-140° C. The invention is limited to a purpose of analysing thermally sensitive materials for volatile components and does not contemplate foaming of a low dielectric material like starch resin within an enclosed mold.

U.S. Pat. No. 5,079,397 (Alcan) teaches of at least two regions of different lossiness in its susceptor materials. Examples of lossy substances suitable for inclusion in microwave susceptors are disclosed as well as techniques for application.

None of the above patents however account for use of a susceptor-type product with a closed mold for bio-degradable foams. In particular, they do not address the critical problems of susceptor and closed mold applications, being the prevention of condensation from of vapor released, and the internal pressures that accumulate within a mold during starch based foaming processes.

Thin Film

A large number of patents refer to the use of thin films as [a]susceptors. For example, U.S. Pat. No. 5,019,681 (Pillsbury) outlines prior art in the field of thin film susceptors where a thin layer such as polyester is used as the substrate with a thin metal film deposited on the substrate. U.S. Pat. No. 5,019,681 outlines further problems, specifically directed towards the breakdown of the susceptor during heating leaving it only suitable for disposable single-use applications.

The prior art whilst helpful does not identify applications requiring and detailing the constraints necessary for successful bio-degradable foam applications. In particular, the prior art does not address the issues inherent to susceptors used in conjunction with closed molds as described above. Namely, being the prevention of condensation from vapor released, while retaining a soft, smooth, surface finish, and the internal pressures that accumulate within a mold during starch based foaming processes.

Other Particulate Options

U.S. Pat. No. 5,294,763 (Minnesota Mining) describes particulate susceptors. Particulate susceptors can be divided into two categories; electrically continuous (e.g. carbon black) or electrically discontinuous (e.g. ferromagnetic particles).

Again the patent does not describe bio-degradable material foaming applications and hence does not consider the particular problems associated with these materials.

It is an object of the current invention to overcome the limitations of the methods above.

It is a further object of the present invention to produce a foamed product with uniform physical and mechanical properties such as density, compressibility, resilience, shock absorption and surface finish by addressing the combination of problems with rate of heating, heating method and mold design in combination.

It is a further object of the present invention to produce a foamed product that is bio-degradable and relatively inexpensive compared with previous methods.

It is an object of the present invention to address the foregoing problems or at least to provide the public with a useful choice.

All references, including any patents or patent applications cited in this specification are hereby incorporated by reference. No admission is made that any reference constitutes prior art. The discussion of the references states what their authors assert, and the applicants reserve the right to challenge the accuracy and pertinency of the cited documents. It will be clearly understood that, although a number of prior art publications are referred to herein, this reference does not constitute an admission that any of these documents form part of the common general knowledge in the art, in New Zealand or in any other country.

It is acknowledged that the term 'comprise' may, under varying jurisdictions, be attributed with either an exclusive or an inclusive meaning. For the purpose of this specification, and unless otherwise noted, the term 'comprise' shall have an inclusive meaning—i.e. that it will be taken to mean an inclusion of not only the listed components it directly references, but also other non-specified components or elements. This rationale will also be used when the term 'comprised' or 'comprising' is used in relation to one or more steps in a method or process.

Further aspects and advantages of the present invention will become apparent from the ensuing description which is given by way of example only.

DISCLOSURE OF INVENTION

For the purposes of this invention, a susceptor is defined as an article which contains microwave interactive material that absorbs microwave energy, and converts it into thermal energy. A susceptor may take many forms, including; a thin film; a liner; a surface coating on a mold. In a further alternative, the mold is the susceptor.

According to one aspect of the present invention there is provided a method of producing a bio-degradable foamed product with qualities of uniformity of mechanical and physical properties throughout the product including:
- a finished foam thickness of up to 1 meter; and
- a finished foam surface suitable for packaging applications; the method including the steps of:
  - (a) placing a bio-degradable raw material that is in a form ready for foaming into a mold to form a moldable assembly, wherein the raw material has been processed into a form ready for foaming;
  - (b) placing at least one mould and material such assembly into a microwave cavity, wherein the microwave cavity includes:
    - (i) a selection of one or more magnetrons focused on a cavity with a total power density of up to 10 W/cm$^3$; and/or
    - (ii) a selection of one or more magnetrons by pre-determination of working volume, final product shape and mold shape;
  - (c) microwaving said at least one moldable assembly to form a bio-degradable foamed product;
- characterized in that the mold includes any one or combinations of:
  - (i) a susceptor or microwave interactive material applied to at least one internal surface of the mold cavity;
  - (ii) a microwave interactive material impregnated into the mold material itself;
  - (iii) a mold material that itself acts as a microwave interactive material to enable the internal surface of the mold to heat uniformly.

In the preferred embodiment, the invention utilizes domestic strength magnetrons thus restricting capital cost of the microwave machinery. Further it is preferred that a number of magnetrons are used in combination. It is understood by the applicant that this has the effect of improving the uniformity of the final product as well as reducing the apparatus expense. By way of example a 15 kW microwave generator has a cost over $150,000 whereas a generator made up of 15 standard domestic 1 kW magnetrons can be purchased for approximately $25,000.

It is proven by the applicant that multiple work pieces can be used with the associated apparatus thus enabling the option of batch or semi-continuous processing of many pieces at once. The subsequent improvement in throughput is particularly advantageous and it is known by the applicant that the proposed method will allow for multiple work pieces.

Semi-continuous processing is also envisaged. One example includes that described in U.S. Pat. No. 4,298,324 whereby a press, a resonant cavity and a mold structure are used. In an alternative a carrousel arrangement is used. In a further example considered by the applicant, a conveyor belt is used on which the work piece(s) travel along. The piece(s) are moved under the apparatus and the belt is raised forming a seal with the walls and ceiling of the microwave device. The seal avoids loss of microwave energy. As each piece finishes microwave processing the belt moves forward and the next set of work piece(s) enter the microwave. In an alternative embodiment, conveyors are used to load multiple cavity molds into and out of a fixed cavity with a side door or doors, rather than the bottom floor sealing mechanism. It will be appreciated the other arrangements are also possible for semi-continuous operation.

In the above described method, the bio-degradable raw material is a bio-degradable polymer or additive selected from the group including: renewable natural resources and modifications of those; non-natural polymerisation of natural monomers or oligmers produced from natural resources; polymers obtained by biotechnological production and other biodegradable polymers such as polyvinyl alcohol (PVA) or polycaprolactone; and combinations thereof.

Other additives can also be included. Typically these additives are selected from a range of biodegradable plasticizers, nucleating agents, processing aids; and combinations thereof.

Further additives with an application dependent function can also be included such as flame retardants, fungus and mold inhibitors, strength adjusting additives, adhesion promoters, viscosity modifiers, fillers and rodent repellents.

The preferred method for preparing the material for foaming is by extrusion or similar heat and shear generating processes known in the art.

In the preferred embodiment, the foamable material has a moisture content of 5 to 30% (w/w). The level of moisture has been found to be most preferably in the range of 15 to 22% (w/w).

In the preferred embodiment, the resulting product has similar mechanical properties to traditional materials. For example, polystyrene is a non bio-degradable material widely used for packaging. Preferred embodiments have comparable mechanical properties such as shock absorption and resilience.

According to a further aspect of the present invention, the base mold material is microwave or substantially microwave transparent. Examples include plastics; ceramics; and glass. Preferably, plastics are selected from the group including: polyethylene (UHMWPE); polyacetal; polysulfone (PSU); polypolyetherimide (ULTEM); polyetherketone (PEEK); epoxy resins; polyphenylene ether; polyphenylsulfone (PPSU); and combinations thereof. Preferably, ceramics are selected from the group including gypsum (plaster of paris) and china clay.

In an alternative embodiment, plastic or ceramic mold materials are reinforced with a filler, microballoons, or glass fibres having low dielectric losses.

For the purposes of this specification, dielectric constant (relative permittivity) is associated with the electric field energy stored in the material. The dielectric constant is the ratio of the permittivity of a substance to the permittivity of free space. It is an expression of the extent to which a material concentrates electric flux.

Preferably base mold materials used have a dielectric constant of 0 to 10 at a frequency of 2.45 GHz and a loss factor of 0 to 0.1 at a frequency of 2.45 GHz. Most preferably materials are used with a dielectric constant of between 0 and 4 at a frequency 2.45 GHz and a loss factor of between 0 and 0.01 at a frequency of 2.45 GHz.

Preferably, molds may include vent holes. These holes are positioned and sized according to the material and shape desired. Vent holes have the effect of allowing air and vapor to be released from the mold and hence tempering and/or removing pressure increases in the mold during processing.

According to a further aspect of the present invention, the mold also includes a susceptor (or is a susceptor itself) capable of absorbing and converting microwave energy into thermal energy while also transmitting sufficient microwave energy to the pellets.

It is understood by the applicant that the thermal energy generated by the mold elevates and maintains the mold surface temperature at a level that prevents the occurrence of condensation. Condensation in the mold has an adverse effect on the foam surface finish. By using a susceptor with appropriate conditions, foam with a smooth and resilient surface finish is achieved. The energy transmitted through the mold is at a level, which allows the required rate of heating of the pellets to be achieved.

In the applicant's experience, an elevated surface temperature also has the added advantage in that it aids in mold release. This is thought to be because the increased surface temperature reduces or eliminates condensation of steam. Steam typically breaks down the starch surface into a sticky substance thus making removal from molds difficult.

Whilst the exact mechanism is not certain, it is the applicant's experience that maintaining or reducing the melt viscosity reduces the resistance to flow across the mold surface, resulting in an improved formation of the foam shape and hence finish.

It has been the applicant's experience that the temperature of the inner mold surface (susceptor) can be designed to reach steady state conditions in the desired temperature range. This results in the same temperature conditions being achieved during each molding cycle, thus giving consistency between production runs.

Further, the mold surface temperature returns to a level where heat transfer from the mold to the pellets does not have an adverse effect on the pellets in the period between loading of the mold and microwave heating. Return to a temperature, which is below the point where significant vapor loss or burning of the pellets occurs, allows the mold to be reused.

Preferably the above elements are achieved by use of: a susceptor including; a thin film; a liner; or a surface coating on a mold. In a further alternative, the mold is the susceptor, with microwave interactive material dispersed throughout the mold material.

Preferably, the microwave interactive material in the susceptor is selected from the group including: electrically resistive or conductive materials, for example, a thin film of a metal or alloy such as aluminium; a resistive or semi conductive substance such as carbon black; graphite; silicon; silicon carbide; metal oxides; sulfides; ferromagnetic materials such as iron or steel or ferromagnetic alloys (stainless steel); ferromagnetic materials such as ferrites; a dielectric material such as acetal; and combinations thereof. Preferably, the susceptor is a liner which includes ferrite dispersed in silicone rubber or other resinous polymeric material.

In an alternative embodiment, the mold itself is a susceptor impregnated with microwave interactive material selected from the group including: electrically resistive or conductive materials, for example, a thin film of a metal or alloy such as aluminium; a resistive or semi conductive substance such as carbon black; graphite; silicon; silicon carbide; metal oxides; sulfides; ferromagnetic materials such as iron or steel or ferromagnetic alloys (stainless steel); ferromagnetic materials such as ferrites; a dielectric material such as acetal; and combinations thereof.

Preferably the mold surface temperature is greater than the melt temperature of the material being foamed and the temperature of the vapor given off during the process. It is the applicant's experience that in such an arrangement, foam with a soft, smooth surface finish and low abrasive characteristics is achieved.

Further embodiments of molds include the ability to have thick foam shapes. A depth of up to 1 meter may be processed using the above apparatus combination giving uniform foaming and subsequent mechanical properties. It is the applicant's experience that the apparatus combination can be used to produce a wide variety of complex shapes only limited by the shape of the mold and the physical limitations of the microwave cavity size.

In a further aspect of the present invention, the material to be foamed and the mold are moved within the microwave field during foaming. It is understood by the applicant that this movement aids in improving the uniformity of the final foamed product.

In preferred embodiments, the microwave apparatus can be adjusted so that the rate of heating and the volume expansion of the material can be altered to obtain a uniform material. Preferred embodiments have the energy density variable from 0.001 to 10 W/cm$^3$ and a rate of heating of 0.1-20° C. per second temperature rise. More preferably the energy density is variable from 0.001 to 1 W/cm$^3$ and the rate of heating is 5-10° C. per second temperature rise.

A preferred frequency of operation for the microwave is from 100 MHz to 5 GHz. More preferably, one single frequency is used during processing. Most preferably, the frequency used is 2450 MHz.

A preferred power for the microwave apparatus is up to 100 kW. It is understood by the applicant that the power requirement is however only limited by either the physical volume of the microwave cavity or the maximum power densities for a given volume.

Preferred embodiments of the microwave process may either utilize the microwave cycle described in PCT/NZ01/00052 or a single step cycle.

Pressure in the microwave cavity and/or mold in conjunction with rapid depressurization can also be used to alter the final properties of the article such as foam density, shock absorption and finish. The parameters for such a process are considered in WO/02/20238 where pressures of up to 50 bar are considered.

Further controls to temperature and humidity can also be applied to the microwave cavity and/or mold during processing to vary the mechanical and surface finish characteristics of the material(s). Prior art suggests that temperatures in the range from 0° C. to 250° C. are useful.

In the present invention, the microwave equipment and/or process can be adjusted to give a finished foam density from 35 to 100 kg/m$^3$. More preferably, this density ranges from 35 to 50 kg/m$^3$. It has been found that this density gives desired physical and mechanical characteristics similar to that of non bio-degradable equivalent materials.

From the above method it is shown that a product can be produced that is biodegradable, has similar mechanical properties to equivalent non-biodegradable materials and has a similar surface finish to alternative products. The process is relatively cheap in capital cost and labor cost compared to existing methods. Limitations of existing processes including non-uniformity, adequate surface finish and low run batch operations, are resolved.

BRIEF DESCRIPTION OF DRAWINGS

Further aspects of the present invention will become apparent from the ensuing description which is given by way of example only and with reference to the accompanying drawings in which.

BEST MODES FOR CARRYING OUT THE INVENTION

In the preferred embodiment, the invention utilizes a plurality of standard domestic magnetrons all concentrated on a cavity containing the material to be foamed and a microwave transparent mold.

In all of the following examples, a microwave consisting of twelve, 850-watt domestic magnetrons based around a power supply at 2450 megahertz is used for foaming the bio-degradable material. The microwave cavity has a volume of approximately 0.4 m³ with a ceiling, walls, and floor according to known specifications.

EXAMPLE 1

This example investigates the effect of rate of heating on the degree of foam formation and the density of the foam.

Figure 3:
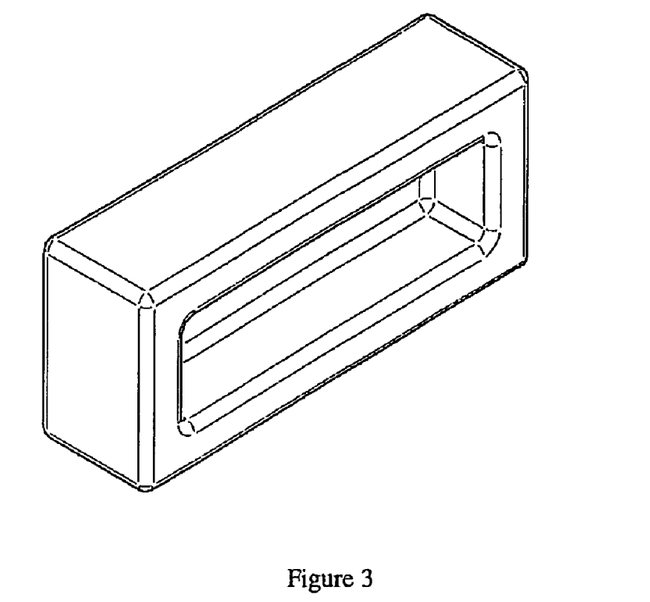
FIG. 3 is an isometric view of a simple shaped foam (from a mold modified to fit a liner)

A mold is prepared for processing a shaped foam article as shown in FIG. 3. The mold volume is approximately 1140 cm³, with a rectangular central section to the site the product to be packaged. Multiple vent holes are present on the upper surface of the mold. The mold is made of ultra high molecular weight polyethylene (UHMWPE). No susceptor is used in this example.

The material for foaming consists of an extrudate, with a moisture content of 22% (w/w) and produced as per PCT/NZ01/00052 with a base material consisting of:

TABLE 1

Showing the raw material composition

| Material | Wt % |
|---|---|
| tapioca starch | 86.75 |
| polyvinyl alcohol | 12 |
| Lecithin | 1 |
| Magnesium silicate | 0.25 |
| TOTAL: | 100.00 |

125 grams of said material is placed into the mold and placed within the microwave cavity.

The samples are then microwaved at atmospheric pressure as follows:

TABLE 2

Showing the sample microwave conditions used

| Sample No. | Power Level | Microwave Time |
|---|---|---|
| 1 | 1 | 260 seconds |
| 2 | 3 | 80 seconds |
| 3 | 6 | 44 seconds |
| 4 | 12 | 24 seconds |

Figure 5:
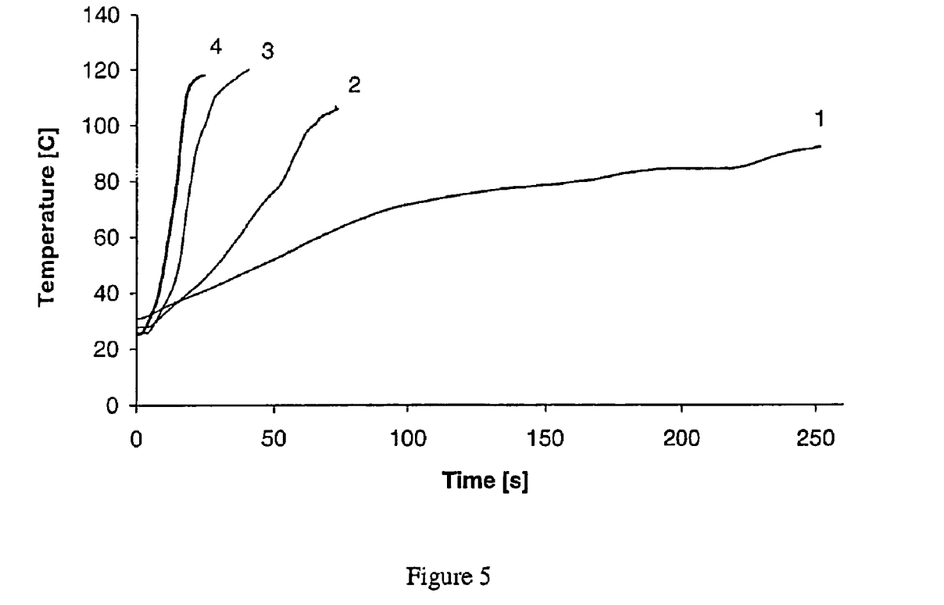
FIG. 5 is a graph showing the heating profiles used in Example 1.

A graphical representation of the resulting heating profiles is shown in FIG. 5.

The resultant foam has the following properties:

TABLE 3

Showing % formation and foam density results

| Sample No. | % Formation | Foam Density [kg/m³] |
|---|---|---|
| 1 | 50% | 204 |
| 2 | 70% | 144 |
| 3 | 90% | 103 |
| 4 | 100% | 91 |

It can be seen from the above example that the higher rate of heating the better the foam formation achieved. It also shows that the higher the rate of heating, the lower the foam density achieved.

The higher rates of heating cause higher vapor pressures to be built up within the pellet, and hence a higher internal pressure within the mold. The higher internal pressure results in improved formation of the foam, as it is the internal pressure that forces the foam into the shape of the mold.

EXAMPLE 2

This example investigates the effect of mold surface temperature on the surface finish and abrasive index of the foam, where results are compared with polystyrene and molded pulp alternatives. The abrasive index represents the level of abrasion, which may occur between the foam and the product, which it is packaging.

Figure 1:
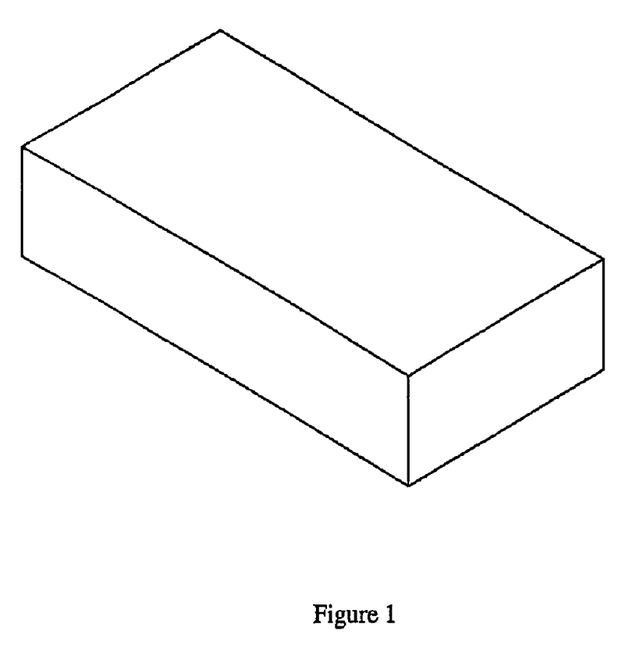
FIG. 1 is an isometric view of rectangular block of foam.

Molds to form a rectangular block as shown in FIG. 1 are prepared for processing as follows:

The mold volume for both molds is approximately 1140 cm³, with a rectangular central section to site the product to be packaged. Multiple vent holes are present on the upper surface of the mold.

Mold 1 is made of ultra high molecular weight polyethylene (UHMWPE) with a wall thickness of 25 mm.

Mold 2 is made of acetal with a wall thickness of 15 mm.

Silicone rubber and ferrite liners of varying compositions are used in each trial

TABLE 4

Showing the liner details

| | Liner | | |
|---|---|---|---|
| | 1 | 2 | 3 |
| Thickness: | 1.6 mm | 5.0 mm | 5.0 mm |
| Weight % ferrite: | 40% | 40% | 60% |

The material for foaming consists of an extrudate as described in Example 1. Samples of 125 g of pellets are microwaved at atmospheric pressure on power level 12 as follows:

1. Two trials were completed using UHMWPE molds (mold 1) microwaved separately, with a microwave processing time of 24 seconds after which time the temperature and abrasive index was measured.
2. One trial was completed using an acetal mold (mold 2) using a processing time of 46 seconds.
3. Mold 1 (UHMWPE) was re-tested using liner 1 (40% ferrite @ 1.6 mm) with a microwave processing time of 24 seconds.
4. Mold 1 (UHMWPE) was re-tested using liner 2 (40% ferrite @ 5.0 mm) with a microwave processing time of 24 seconds.
5. Mold 1 (UHMWPE) was re-tested using liner 3 (60% ferrite @ 5.0 mm) with a microwave processing time of 24 seconds.

Figure 6:
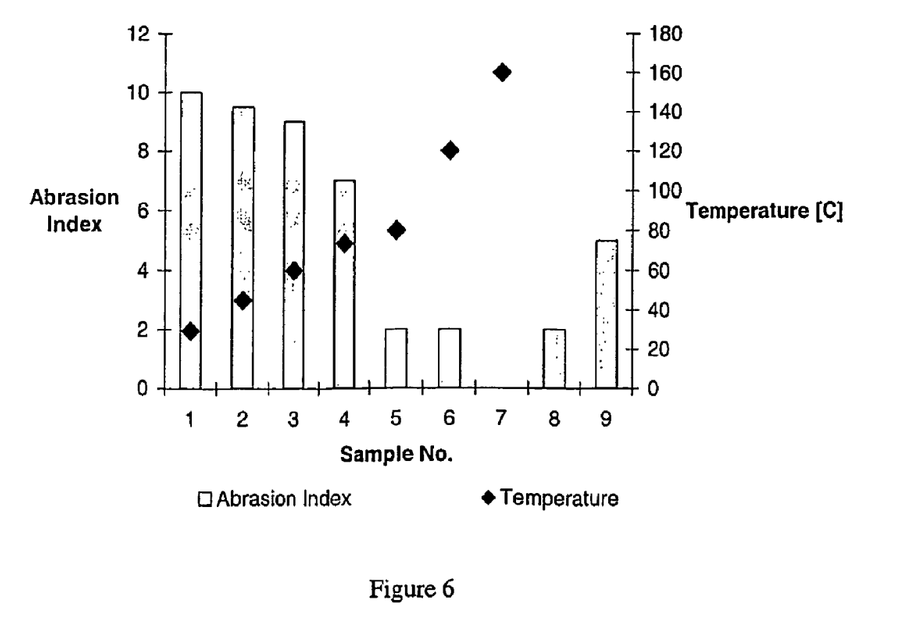
FIG. 6 is a graph showing the effect of surface temperatures on abrasive index as described in Example 2.

The resultant foam also shown in the graph in FIG. 6 has the following properties:

TABLE 5

Showing effect of surface temperature on surface finish and abrasive index
Abrasive Index Scale: 0 → 10 Highly abrasive: 10 Low Abrasion: 0
(polystyrene and molded pulp properties are given by way of reference).

| Sample | Packaging Material | Surface Temperature [° C.] | Surface Finish | Abrasion Index |
|---|---|---|---|---|
| 1 | starch foam | 29 | Rough, brittle & pitted | 10 |
| 2 | starch foam | 45 | Rough, brittle & pitted | 9.5 |
| 3 | starch foam | 60 | Rough, brittle & pitted | 9 |
| 4 | starch foam | 74 | Rough, brittle & pitted | 7 |
| 5 | starch foam | 80 | Smooth, soft but resilient | 3 |
| 6 | starch foam | 120 | Smooth, soft but resilient | 2 |
| 7 | starch foam | 160 | Dry, weak & brittle | N/A |
| 8 | Polystyrene | N/A | | 2 |
| 9 | molded pulp | N/A | | 5 |

From the above results it can be seen that by elevating the surface temperature of the mold, the quality of the surface finish of the foam is improved. This is evident in both the recorded observations and the abrasion index measurement. It can also be seen that the surface finish achieved on the starch foam is comparable with that of polystyrene and superior to that of molded pulp packaging.

Steam, given off during the process, condenses on the mold walls and the condensate causes the cellular structure of outer surface of the foam to collapse. It also causes pitting and the formation of a hard, brittle and abrasive surface finish. If the temperature of the inner mold surface is elevated, condensation of the steam is prevented and the resulting foam surface finish is highly improved.

EXAMPLE 3

This example investigates the effect of elevation and control of the mold surface temperature on the degree of foam formation.

The UHMWPE mold described in Example 2 and the liners described below, were used in this example to complete a total of nine trials.

TABLE 6

Showing the mold details

| | Liner | | |
|---|---|---|---|
| | 1 | 2 | 3 |
| Thickness: | 1.6 mm | 2.5 mm | 5.0 mm |
| Weight % ferrite: | 40% | 40% | 40% |

1. Using an UHMWPE mold and liner 1, three separate loads of 125 g of pellets were microwaved on power level 12 for 24 seconds.
2. Using an UHMWPE mold and liner 2, three separate loads of 125 g, 135 g and 145 g of pellets were microwaved on power level 12 for 24 seconds.
3. Using an UHMWPE mold and liner 3, three separate loads of 125 g, 135 g and 145 g of pellets were microwaved on power level 12 for 24 seconds.

The resultant foam had the following properties:

TABLE 7

Showing improved degree of formation at lower densities through elevation of surface temperature

| Sample | Temp [° C.] | Density [kg/m$^3$] | Formation |
|---|---|---|---|
| Liner 1, Sample 1 | 60 | 105 | 100% |
| Liner 1, Sample 2 | 60 | 95 | 80% |
| Liner 1, Sample 3 | 60 | 85 | 70% |
| Liner 2, Sample 4 | 80 | 105 | 100% |
| Liner 2, Sample 5 | 80 | 95 | 90% |
| Liner 2, Sample 6 | 80 | 85 | 80% |
| Liner 3, Sample 7 | 120 | 105 | 100% |
| Liner 3, Sample 8 | 120 | 95 | 100% |
| Liner 4, Sample 9 | 120 | 85 | 100% |

It can be seen from this example that a higher surface temperature results in full foam formation at a lower density than occurs with a lower surface temperature.

EXAMPLE 4

This example demonstrates how foam shapes of both simple and complex geometries can be processed using the same microwave configuration.

In this example, the material for foaming consists of an extrudate, as described in Example 1. The microwave geometry is maintained the same throughout the experiment as that of earlier examples. Four different shaped molds are used as follows:

TABLE 8

Showing the Mold details

Figure 2:
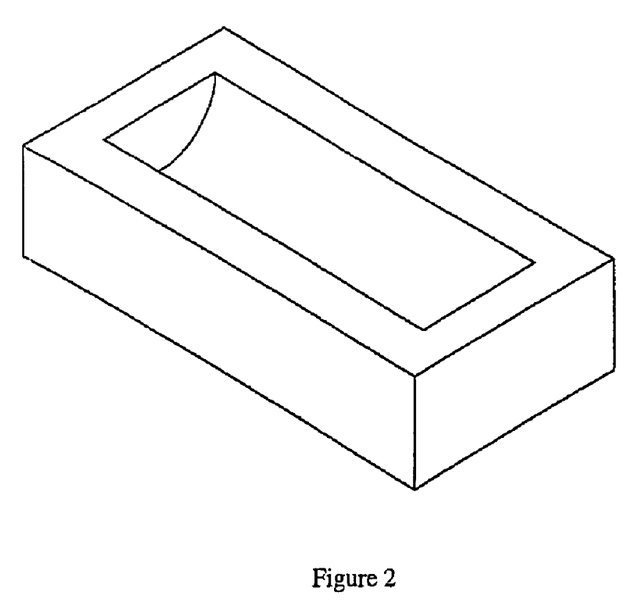
FIG. 2 is an isometric view of bottle mold foam.
Figure 4:
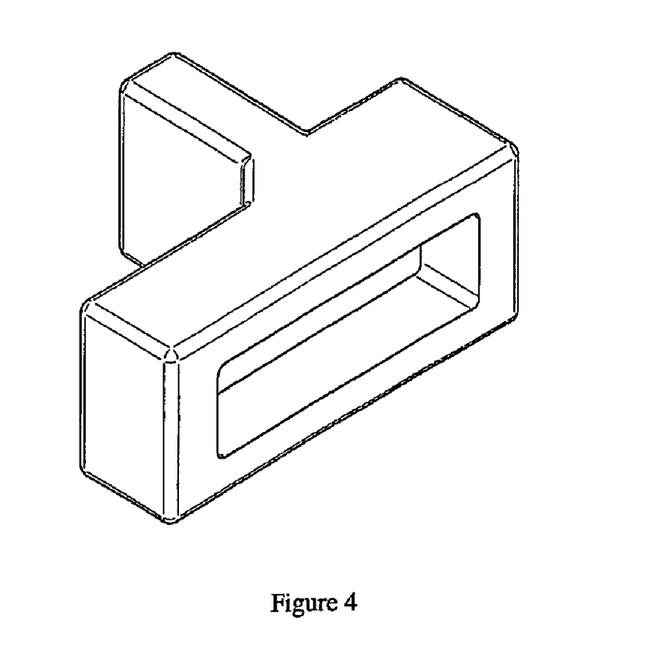
FIG. 4 is an isometric view of a complex shaped foam.

| | Mold | | | |
|---|---|---|---|---|
| | 1 | 2 | 3 | 4 |
| Mold Name: | Rectangular block (as shown in FIG. 1) | Bottle mold (as shown in FIG. 2) | Simple End Cap (as shown in FIG. 3) | Complex End Cap (as shown in FIG. 4) |
| Material: | UHMWPE | UHMWPE | UHMWPE | UHMWPE |
| Wall thickness: | 25 mm | 25 mm | 25 mm | 25 mm |
| Volume: | 0.00145 m$^3$ | 0.00114 m$^3$ | 0.00127 m$^3$ | 0.00184 m$^3$ |

The following trials were then completed where each mold was placed into the microwave cavity individually and treated as follows:

TABLE 9

Showing the mold, the amount of raw material used and the microwave conditions

| Mold | Pellet Load | Processing Time |
| --- | --- | --- |
| 1 (Rectangular) | 140 g | 30 seconds |
| 2 (Bottle mold) | 115 g | 24 seconds |
| 3 (Simple End Cap) | 125 g | 24 seconds |
| 4 (Complex End Cap) | 220 g | 38 seconds |

After each trial, the density of the resulting foamed product was measured and compared. The results were as follows:

TABLE 10

Showing the success of molding different shapes using the same microwave generator equipment

| Trial | Power Level | Process Time | Mass Pellets | Mass Foam | % Formed | Density |
| --- | --- | --- | --- | --- | --- | --- |
| 1 | 12 | 30 sec | 153 g | 132 g | 100% | 91 g/L |
| 2 | 12 | 24 sec | 110 g | 94 g | 100% | 82.5 g/L |
| 3 | 12 | 24 sec | 125 g | 106 g | 100% | 83.5 g/L |
| 4 | 12 | 38 sec | 220 g | 186 g | 100% | 101 g/L |

The above trial shows that a wide variety of shapes can be processed giving uniform properties via the same microwave equipment thus reducing costs associated with microwave equipment modifications and labor costs in manufacturing such pieces.

EXAMPLE 5

This example investigates whether or not various silicone/ferrite liners come to steady state temperature and if so, at what steady state temperature is a good surface finish achieved?

In this example, the material for foaming consists of an extrudate, as described in Example 1.

A mold is used as described in Example 1 (UHMWPE).

Three different types of silicone/ferrite liner are trialed as follows:

TABLE 11

Showing the Liner details

| | Liner | | |
| --- | --- | --- | --- |
| | 1 | 2 | 3 |
| Thickness: | 1.6 mm | 2.5 mm | 5.0 mm |
| Weight % Ferrite: | 40% | 40% | 40% |

A sample of 125 g of starch pellets was microwaved in the UHMWPE mold fitted with liner 1 at power level 12 and with a microwave processing time of 30 seconds. The process was repeated for liners 2 and 3.

The resulting foamed products gave the following properties:

TABLE 12

Showing the effect of surface temperature on foam finish

| Trial | Steady State Surface Temperature [C.] | Foam Surface Finish | Number of Runs Required to Achieve Steady State | Total Number of Runs |
| --- | --- | --- | --- | --- |
| Liner 1 | 60 | Hard pitted surface | 4 | 20 |
| Liner 2 | 120 | Smooth soft surface finish | 4 | 20 |
| Liner 3 | 190 | Thermal degradation of foam, foam surface dry and brittle | 4 | 20 |

As in example 2, elevating the surface temperature of the mold is found to improve the surface finish of the foam. This example also shows that a ferrite/silicone liner can be designed so that it comes to steady state in the desired temperature range. Achieving steady state is of major significance as it allows the mold to be used repeatedly without delay in a production environment. If steady state were not achieved, variation of product quality would be experienced and thermal runaway would be likely.

EXAMPLE 6

This example illustrates how a thin film metal susceptor can be used to generate sufficient surface heating to prevent condensation and improve the surface finish on the foam In this example, the material for foaming consists of an extrudate, as described in Example 1.

An UHMWPE mold of volume 1140 cm$^3$ is used, laminated with a polyethylene terephthalate aluminium (Al/PET) film. The aluminium thickness is approximately 0.02 microns.

Figure 7:
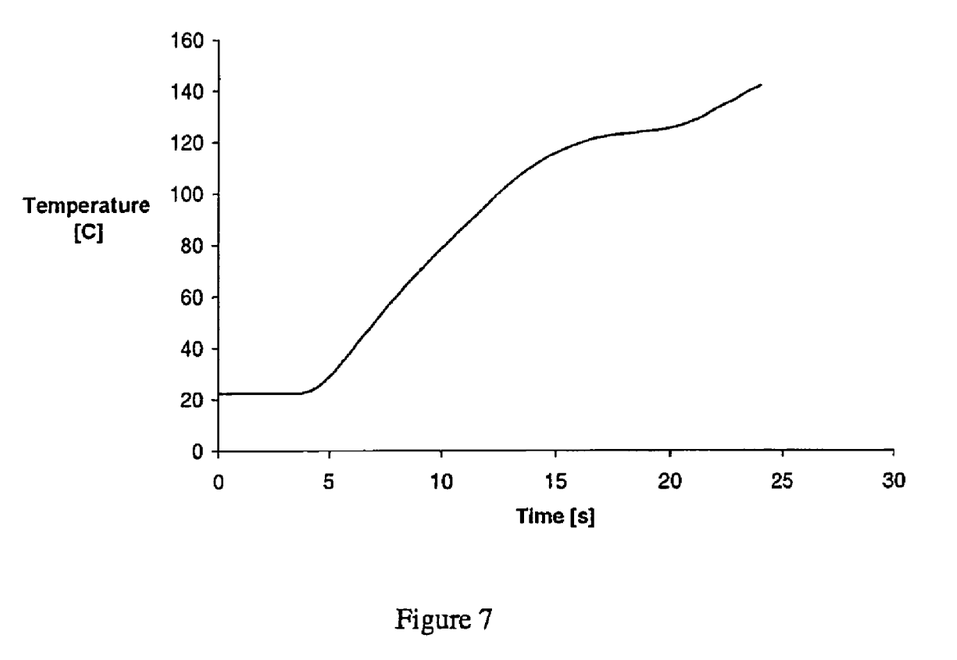
FIG. 7 is a graph showing the temperature profile used in Example 6.

A sample of 125 g of starch pellets were placed in the lined mold and microwaved at power level 12 with a microwave processing time of 24 seconds. The temperature profile for the aluminium/PET film is shown in FIG. 7.

The resulting foamed product gave a surface result with a smooth, soft, but resilient surface. A comparative mold without an aluminium/PET film yields foam with a rough, brittle and pitted surface.

The example shows that the thin film aluminium heats when exposed to microwave energy as the result of an $I^2R$ (Ohmic) heating mechanism. This heating generates a surface temperature sufficient to prevent condensation and yield foam with an improved surface finish. Films that generate a surface temperature above this range (180° C.) result in browning/burning of the foam surface.

EXAMPLE 7

This example investigates the effect of matching the mold surface temperature to the melt temperature of the material. It is known that if no temperature gradient exists then no net transfer of energy can occur.

In this example, the material for foaming consists of an extrudate, as described in Example 1. A mold is used as described in Example 1 (UHMWPE).

A sample of 125 g of starch pellets was microwaved in the UHMWPE mold at a microwave power level of 12 with a microwave processing time of 24 seconds. A similar experiment was also completed whereby the mold surface temperature was less than the melt temperature.

The results were as follows:

TABLE 13 showing the effect of surface temperature against that of the melt temperature

| Example | Temperature | Foam surface |
| --- | --- | --- |
| FIG. 1 | Tsurface > Tmelt & Tvapor | Soft smooth surface finish |
| FIG. 2 | Tsurface < Tmelt & Tvapor | Hard, brittle, pitted surface finish |

It can be seen from the above example that where the surface temperature is less than that of the melt temperature, a poor foam surface finish is achieved.

From the examples it can be seen that a variety of molds and options for altering the surface finish can be used as required. In particular mold surface temperature modifiers particularly aid finish. The process produces a product with comparable qualities to alternative non-biodegradable products such as polystyrene. Further, the process cost is minimized by utilizing standard domestic magnetrons rather than very expensive high power magnetrons.

Aspects of the present invention have been described by way of example only and it should be appreciated that modifications and additions may be made thereto without departing from the scope thereof as defined in the appended claims.

What we claim is:

1. A method of producing a bio-degradable foamed product, with a smooth surface finish and density of about 35 to 100 kg/m$^3$ the method comprising
   preparing a bio-degradable raw material ready for foaming by process of heat and shear;
   placing the material into a closed mold to form a moldable assembly;
   microwaving at least one said moldable assembly to form a bio-degradable foamed product;
   wherein said mold comprises at least one of:
   microwave interactive material disposed on at least one internal surface of a cavity in said mold;
   microwave interactive material impregnated into the mold material itself; and
   combinations thereof such as to enable the internal surface of the mold to be heated substantially uniformly by microwave radiation to a temperature that is greater than a melt temperature of said material being foamed in said mold and high enough to prevent vapour condensation on the surface of the foamed article.

2. A method of producing a bio-degradable foamed product as claimed in claim 1 which utilizes domestic strength magnetrons.

3. A method of producing a bio-degradable foamed product as claimed in claim 1 by semi continuous processing comprising:
   (i) moving at least one moldable assembly on a conveyer belt into under a microwave apparatus;
   (ii) sealing said microwave apparatus between said belt, walls of said microwave apparatus and a ceiling of said microwave apparatus;
   (iii) commencing microwave processing irradiation;
   (iv) moving said conveyor belt forward at a speed such that as each moldable assembly finishes microwave processing, the next moldable assembly enters the microwave apparatus.

4. A method of producing a bio-degradable foamed product as claimed in claim 1 by semi continuous processing comprising:
   moving at least one moldable assembly on a conveyer belt into a cavity of a microwave apparatus;
   sealing said cavity by closing a door thereto;
   commencing microwave processing; and
   as the piece finishes microwave processing, opening the door is and moving the belt forward such that the next moldable assembly enters the microwave apparatus cavity.

5. A method of producing a bio-degradable foamed product as claimed in claim 1, wherein the bio-degradable raw material is selected from the group consisting of: renewable natural resources and modifications of such natural resources; non-natural polymerization products of monomers derived from natural resources; non-natural polymerization products of oligomers derived from natural resources; polymers obtained by biotechnological production; and bio-degradable polymers selected from the group consisting of: polyvinyl alcohol (PVA); polycaprolactone; and combinations thereof.

6. A method of producing a bio-degradable foamed product as claimed in claim 1, wherein the bio-degradable raw material additionally comprises additives selected from the group consisting of: biodegradable plasticizers; nucleating agents; processing aids; and combinations thereof.

7. A method of producing a bio-degradable foamed product as claimed in claim 1 wherein the heat and shear generating process is extrusion.

8. A method of producing a bio-degradable foamed product as claimed in claim 1 wherein the bio-degradable material prepared in step (a) has a moisture content of 5 to 30% (w/w).

9. A method of producing a bio-degradable foamed product as claimed in claim 1 wherein the base mold material is substantially microwave transparent.

10. A method of producing a bio-degradable foamed product as claimed in claim 1, wherein the base mold material is selected from the group consisting of: a plastic; a ceramic; glass; and combinations thereof.

11. A method of producing a bio-degradable foamed product as claimed in claim 10 wherein said plastic is at least one member selected from the group consisting of: polyethylene (UHMICROWAVEPE); polyacetal; polysulfone (PSU); polypolyetherimide (ULTEM); polyetherketone (PEEK); epoxy resins; polyphenylene ether; polyphenylsulfone (PPSU); and combinations thereof.

12. A method of producing a bio-degradable foamed product as claimed in claim 10 wherein said ceramic is at least one member selected from the group consisting of gypsum (plaster of paris) and china clay.

13. A method of producing a bio-degradable foamed product as claimed in claim 1, wherein the mold material is reinforced with at least one low dielectric loss material selected from the group consisting of: a filler material with a low dielectric loss; micro-balloons; glass fibres; and combinations thereof.

14. A method of producing a bio-degradable foamed product as claimed in claim 1 wherein said mold material has a dielectric constant of 0 to 10 at a frequency of 2.45 GHz, and a loss factor of 0 to 0.1 at a frequency of 2.45 GHz.

15. A method of producing a bio-degradable foamed product as claimed in claim 1 wherein the mold has vent holes.

16. A method of producing a bio-degradable foamed product as claimed in claim 1 wherein the microwave interactive material is applied to the mold in a form selected from the group consisting of: a thin film; a liner; a surface coating.

17. A method of producing a bio-degradable foamed product as claimed in claim 1, wherein the mold acts as a susceptor and microwave interactive material is dispersed throughout the mold material.

18. A method of producing a bio-degradable foamed product as claimed in claim 1 wherein the microwave interactive material is selected from the group consisting of: electrically resistive materials; conductive materials; semi-conductive materials; and combinations thereof.

19. A method of producing a bio-degradable foamed product as claimed in claim 18, wherein the microwave interactive material is aluminium.

20. A method of producing a bio-degradable foamed product as claimed in claim 18, wherein the microwave interactive material is selected from the group consisting of; carbon black; graphite; silicon; silicon carbide; metal oxides; sulfides; ferromagnetic materials; a dielectric material; and combinations thereof.

21. A method of producing a bio-degradable foamed product as claimed in claim 1 wherein the microwave interactive material is ferrite dispersed in silicone rubber or other resinous polymeric material formed into a shape that lines the interior surfaces of the mold.

22. A method of producing a bio-degradable foamed product as claimed in claims 1 wherein the inner mold surface temperature during microwave processing is between about 50° C. and 190° C. as a consequence of the presence of a susceptor or microwave interactive material.

23. A method of producing a bio-degradable foamed product as claimed in claim 1 wherein, under steady state operating conditions, the maximum inner mold surface temperature is between about 50° C. and 190° C. as a consequence of the presence of a selected susceptor or microwave interactive material.

24. A method of producing a bio-degradable foamed product as claimed in claim 1 wherein the moldable assembly is moved within the microwave field during foaming.

25. A method of producing a bio-degradable foamed product as claimed in claim 1 wherein the energy density in said microwave apparatus is about 0.001 to 10 W/cm$^3$ during processing.

26. A method of producing a bio-degradable foamed product as claimed in claim 1 wherein the internal rate of heating within the material during foaming is controlled to about 0.1-20° C. per second temperature rise.

27. A method of producing a bio-degradable foamed product as claimed in claim 1 wherein said microwave is operated, during processing, at a frequency of about 100 MHz to 5 GHz.

28. A method of producing a bio-degradable foamed product as claimed in claim 1 wherein the power for the microwave apparatus is up to about 100 kW.

29. A method of producing a bio-degradable foamed product as claimed in claim 1 wherein the nominal microwave frequency, power level and energy density remain the same for different shaped foamed objects.

30. A method of producing a bio-degradable foamed product as claimed in claim 1 wherein the nominal microwave frequency, power level and energy density are adjusted dependent on the shape of the foamed product to be produced.

31. A method of producing a biodegradable foamed product as claimed in claim 1 wherein rapid depressurization is used in conjunction with microwave irradiation during step (c).

32. A method of producing a biodegradable foamed product as claimed in claim 1 wherein elevated pressure is used in conjunction with microwave irradiation during step (c).

33. A method of producing a bio-degradable foamed product as claimed in claim 1 wherein the mold further comprises microwave interactive material disposed on at least one internal surface of a cavity in said mold.

34. A method of producing a bio-degradable foamed product as claimed in claim 1 wherein, the temperature of the inner mold surface is between about 80° C. and about 120° C.

35. A method of producing a bio-degradable foamed product as claimed in claim 1 wherein, the temperature of the inner mold surface is about 120° C.

36. A method of producing a bio-degradable foamed product as claimed in claim 1 wherein, the biodegradable foam product has a wall thickness of up to 1 meter.

37. A method of producing a bio-degradable foamed product as claimed in claim 1 which comprises using water as a blowing agent.

* * * * *